United States Patent Office 3,251,839
Patented May 17, 1966

3,251,839
4,4'-DIPYRIDYL DIHETEROCYCLIC CARBAMYL METHYL QUATERNARY AMMONIUM SALTS
John Edward Downes and Donald William Ronald Headford, Bracknell, England, assignors to Imperial Chemical Industries Limited, Millbank, London, England, a corporation of Great Britain
No Drawing. Filed Jan. 11, 1963, Ser. No. 250,786
Claims priority, application Great Britain, Jan. 22, 1962, 2,210/62; Nov. 8, 1962, 42,269/62
3 Claims. (Cl. 260—246)

This invention related to new bipyridylium quaternary salts, to processes for their preparation and to herbicidal compositions containing them.

U.K. specification No. 813,532 discloses the use as herbicides of compounds of the formula:

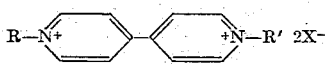

where R and R' are alkyl radicals of not more than four carbon atoms which are substituted with a carbamyl or N-substituted carbamyl group; and X⁻ is an anion.

We have now found, according to the present invention, that certain N-substituted carbamyl compounds of the formula shown above show selective herbicidal activity against broad-leafed species compared with their activity against grass species. The selective compounds are those of the formula:

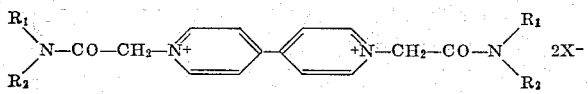

where $R_1$ and $R_2$ are both hydrogen atoms, or are each an alkyl radical of 1–3 carbon atoms or an alkoxyalkyl of 2, 3 or 4 carbon atoms, or $R_1$ and $R_2$ together with the nitrogen atom to which they are attached constitute a pyrrolidine, piperidine or morpholine ring optionally having a methyl radical as substituent; and X⁻ is an anion. The anion X⁻ can be a monovalent ion, for example chloride, iodide, or bromide, or a divalent ion—where of course the symbol 2X⁻ in the above structural formula represents a single ion rather than two monovalent ions. The choice of anion depends to a large extent upon the solubility of the respective salts in water and upon the ease with which the salts can be prepared.

The invention also consists in a process for the preparation of the compounds of the invention, in which 4,4'-bipyridyl or a mono-quaternary salt of the formula:

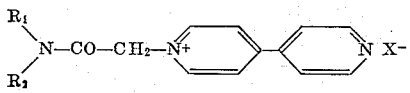

where $R_1$, $R_2$ and X⁻ have the meaning given above, is quaternised with a suitable quaternising agent. The process can be performed by simply heating a mixture of 4,4'-bipyridyl (or the mono-quaternary salt as the case may be) with the quaternising agent. However, in some instances, especially where operating on a large scale, it may be more convenient to use a suitable liquid as solvent or diluent for the reactants.

The invention includes herbicidal compositions containing as active ingredient a compound of the invention, and a carrier for the active ingredient. The composition can, for example, be a liquid composition obtained by dissolving or dispersing the active ingredient in a suitable diluent, for example water or a suitable organic liquid. The herbicidal composition alternatively can be in the form of a powder in which the active ingredient is in admixture with a powder diluent. The compositions can contain a wettting or dispersing agent to facilitate their use as spray compositions, or indeed can contain any other type of substance known to the art as being suitable as an adjuvant in herbicidal compositions, for instance stickers, binders, corrosion inhibitors and colouring agents.

Any wetting or dispersing agent used in the herbicidal compositions should preferably be a non-ionic surface-active compound, for instance an ethylene oxide-octyl phenol condensate, or a cationic compound, so as to avoid any undesirable interaction between the surface-active compound and the bipyridylium salt which might take place if an anionic compound were to be used as surface-active compound.

The invention further consists in a method of killing, desiccating or otherwise severely damaging undesirable vegetation, in which the vegetation is treated with an effective amount of a compound or herbicidal composition of this invention.

The invention is illustrated by the following examples.

EXAMPLE 1

N,N-di-isopropyl chloroacetamide (12.3 g.) and 4,4'-bipyridyl (4.6 g.) were heated and stirred together at 100° C. until a homogenous liquid was obtained. The temperature of this liquid was then raised to 140° C. at which temperature a vigorous reaction took place and the mixture solidified. After heating the solidified mixture for 30 minutes, the solid was crushed, washed with acetone and recrystallised from about 300 ml. of ethanol, affording 1,1'-bis-(di-isopropylcarbamyl-methyl) 4,4'-bipyridylium dichloride. No melting point of the product has been recorded as the sample tested showed no sign of melting at temperatures up to 320° C.

EXAMPLES 2–16

A number of other substituted 4,4'-bipyridylium dichlorides have been made by the process described in Example 1 above, but using various N,N-di-substituted chloroacetamides or cyclic chloroacetamides instead of the N,N-di-isopropyl chloroacetamide used in that example. These other bipyridylium salts, which are set out in the table below as Examples 2–16, are all believed to have structures corresponding to the structural formula:

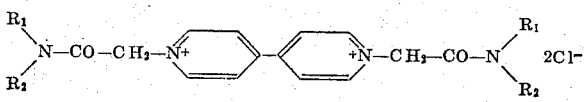

and were obtained by a process in which there was used a chloroacetamide of the formula:

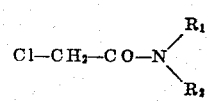

In each instance the chloracetamide and 4,4'-bipyridyl were used in a molar ratio in the range 1:1 to 1.1:1.

The products of Examples 2–16 are identified in the table by the meaning given to the group

and the melting point shown against the products are those obtained using a sample of the product which had been purified by recrystallisation, melting in each instance being accompanied by decomposition of the sample under test.

The substances obtained as products of the examples have been tested for herbicidal activity against both broad-leafed plant species and grasses, and the results are expressed in the right-hand columns of the table. Under the heading "Herbicidal activity" is shown the amounts (in lbs./acre) of the various compounds, expressed in terms of their respective cations, found necessary to obtain a 50% kill of the species tested 14 days after application to the test plants. The broad-leafed and grass species (referred to in the table under the respective headings B and G) were as follows:

*Broad-leafed species*
Sugar beet (*Beta vulgaris*)
Mustard (*Sinapis alba*)
Kale (*Brassica oleracea*)
Clover (*Trifolium pratense*)
Redshank (*polygonum persicaria*)
Mayweed (*Matricaria inodora*)

*Grass species*
Wheat (*Triticum vulgare*)
Wild oats (*Avena fatua*)
Barley (*Hordeum sativum*)
Cocksfoot (*Dactylis glomerata*)

The term "50% kill" used above refers to the species treated having been damaged to a total extent of 50% compared with untreated control plants; it does not necessarily mean that 50% of the plants treated had been killed. The assessment of the herbicidal effect of the substances tested was made as follows:

Batches of plants of each of the broad-leafed and grass species were sprayed with aqueous solutions of the test substances at a range of concentrations. The herbicidal damage caused to each batch was visually assessed 14 days after spraying as a percentage, taking undamaged control plants as 0% and completely dead plants as 100%. The mean values obtained against all the broad-leafed species and the grass species at each particular concentration was then calculated and these mean values were plotted against concentration on a logarithmic scale. From the resulting graph the concentration of each substance required to produce 50% kill was then read off.

The figures given in the extreme right-hand column of the table under "Index of Selectivity" are the ratios of the adjacent figures against broad-leafed and grass species and it will be seen that several of the compounds show a most marked selective action against broad-leafed species.

TABLE I

| Example No. | $-N\begin{smallmatrix}R_1\\R_2\end{smallmatrix}$ | Water of crystallisation | M.P. (decomp.) (°C.) | Herbicidal activity B | Herbicidal activity G | Index of Selectivity |
|---|---|---|---|---|---|---|
| 1 | $-N(C_3H_7iso)_2$ | Anhydrous | | 0.063 | >8 | 127 |
| 2 | $-NH_2$ | $H_2O$ | >330 | 0.020 | 0.25 | 12 |
| 3 | $-N(CH_3)_2$ | Anhydrous | 315 | 0.021 | 0.17 | 8 |
| 4 | $-N(C_3H_{7n})_2$ | $2H_2O$ | 277 | 0.063 | 0.5 | 8 |
| 5 | $-N(CH_2-CH_2-O-C_2H_5)_2$ | $H_2O$ | 244 | 0.067 | >28 | >420 |
| 6 | $-N(CH_2-CH_2-O-CH_3)_2$ | $2H_2O$ | 258 | 0.030 | >6.5 | >215 |
| 7 | $-N(CH_2-CN)_2$ | $2H_2O$ | 320 | 0.17 | >5.0 | >30 |
| 8 | -N(piperidine) | $H_2O$ | 301 | 0.083 | 25 | 300 |
| 9 | -N(2,6-dimethylpiperidine) | $2H_2O$ | 284 | 0.28 | >24 | 84 |
| 10 | -N(pyrrolidine) | $H_2O$ | 295 | 0.050 | 1.6 | 32 |
| 11 | -N(morpholine) | $H_2O$ | 302 | 0.059 | 6.0 | 102 |
| 12 | -N(2,6-dimethylmorpholine) | $2H_2O$ | 303 | 0.027 | 6.1 | 229 |
| 13 | -N(3,5-dimethylmorpholine) | $2H_2O$ | 318 | 0.029 | >6.5 | >221 |
| 14 | -N(2-methylpiperidine) | $2H_2O$ | 298 | 0.077 | >8.0 | >104 |
| 15 | -N(hexamethyleneimine) | $3H_2O$ | 282 | 0.33 | >8 | >24 |
| 16 | $-N(CH_2-CH_2-CN)_2$ | Anhydrous | 271 | 0.33 | >8 | >24 |

Patent No. 813,532 discloses 4,4′-dipyridyl di-(N,N-diethylcarbamylmethochloride), known also by the alternative name 1,1′ - bis-(diethylcarbamylmethyl)-4,4′-bipyridylium dichloride, and no claim is now made to that compound.

Compounds of the invention, for instance the product of Example 1, have shown anti-fungal activity in vitro tests when applied as an aqueous solution to spores of wheat leaf rust (*Puccinia recondita*).

What we claim is:

1. A 4,4′-bipyridylium quaternary salt of the formula:

wherein $R_1$ and $R_2$ each represent the atoms necessary to complete, together with the adjacent nitrogen atom, a heterocyclic radical selected from the group consisting of pyrrolidino, piperidino, morpholino, methyl-pyrrolidino, methyl-piperdino, methyl-morpholino and hexamethyleneimino; and $X^-$ in an anion.

2. A quaternary salt according to claim 1 wherein $R_1$ and $R_2$ each represent the atoms necessary to complete the 2-methyl piperino radical.

3. A quaternary salt according to claim 1 wherein $R_1$ and $R_2$ each represent the atoms necessary to complete the 3,5-dimethyl morpholino radical.

References Cited by the Examiner

UNITED STATES PATENTS

| | | | |
|---|---|---|---|
| 2,769,818 | 11/1956 | Schlessinger | 71—2.5 |
| 2,913,323 | 11/1959 | Cameron | 71—2.5 |
| 2,914,392 | 11/1959 | D'Amico | 71—2.5 |
| 2,929,818 | 3/1960 | Janssen | 260—295 |
| 2,972,528 | 2/1961 | Brian et al. | 71—2.5 |
| 3,025,294 | 3/1962 | Huebner | 260—247.5 |

FOREIGN PATENTS

| | | |
|---|---|---|
| 813,532 | 5/1959 | Great Britain. |

NICHOLAS S. RIZZO, *Primary Examiner.*

IRVING MARCUS, *Examiner.*